United States Patent
Nakayasu

(10) Patent No.: US 8,862,149 B2
(45) Date of Patent: Oct. 14, 2014

(54) RADIO COMMUNICATION SYSTEM, RADIO BASE STATION DEVICE, AND DEVICE FOR DETERMINING PARAMETERS

(75) Inventor: Kanada Nakayasu, Tokyo (JP)

(73) Assignee: Nec Corporation, Tokyo (JP)

( * ) Notice: Subject to any disclaimer, the term of this patent is extended or adjusted under 35 U.S.C. 154(b) by 87 days.

(21) Appl. No.: 13/320,415

(22) PCT Filed: May 14, 2010

(86) PCT No.: PCT/JP2010/003283
§ 371 (c)(1),
(2), (4) Date: Nov. 14, 2011

(87) PCT Pub. No.: WO2010/131484
PCT Pub. Date: Nov. 18, 2010

(65) Prior Publication Data
US 2012/0064918 A1    Mar. 15, 2012

(30) Foreign Application Priority Data
May 14, 2009   (JP) .............................. P2009-1179252

(51) Int. Cl.
*H04W 24/00*    (2009.01)
*H04W 24/02*    (2009.01)
*H04W 24/06*    (2009.01)
(52) U.S. Cl.
CPC .............. *H04W 24/02* (2013.01); *H04W 24/06* (2013.01)
USPC ...................................................... 455/456.1
(58) Field of Classification Search
CPC ........ H04W 64/00; H04W 4/02; H04W 88/08
USPC ............. 455/403, 404.2, 456.1, 456.2, 456.6, 455/560, 561
See application file for complete search history.

(56) References Cited

U.S. PATENT DOCUMENTS

| | | | |
|---|---|---|---|
| 6,571,097 B1 * | 5/2003 | Takai | 455/436 |
| 7,474,898 B2 * | 1/2009 | Yamazaki | 455/456.6 |
| 7,778,634 B2 * | 8/2010 | Sakawa | 455/423 |
| 2002/0049064 A1 * | 4/2002 | Banno | 455/456 |
| 2004/0242276 A1 * | 12/2004 | Kashiwagi et al. | 455/562.1 |
| 2006/0239238 A1 * | 10/2006 | Fernandez-Corbaton et al. | 370/342 |

(Continued)

FOREIGN PATENT DOCUMENTS

| | | |
|---|---|---|
| CN | 101208966 A | 6/2008 |
| JP | 2000316180 A | 11/2000 |

(Continued)

OTHER PUBLICATIONS

International Search Report for PCT/JP2010/003283 mailed Jul. 13, 2010.

(Continued)

*Primary Examiner* — Cong Tran
(74) *Attorney, Agent, or Firm* — Sughrue Mion, PLLC

(57) ABSTRACT

A radio communication system according to the present invention includes a radio base station device and a parameter determination device. The radio base station device includes: an antenna device which performs radio communication with a mobile station device; a positional information acquisition unit which acquires positional information representing a position of the antenna device; and a control unit which notifies the parameter determination device of the positional information acquired by the positional information acquisition unit, and controls the antenna device according to a parameter transmitted from the parameter determination device. The parameter determination device includes: a storage unit which stores information of a periphery where the radio base station device is installed; and a parameter determination unit which determines a parameter of the radio base station device based on the periphery information and the positional information of the radio base station device, and transmits the determined parameter to the radio base station device.

7 Claims, 6 Drawing Sheets

(56) References Cited

U.S. PATENT DOCUMENTS

2009/0298515 A1* 12/2009 Czaja et al. ............... 455/456.5
2010/0093368 A1* 4/2010 Meyer et al. ............... 455/456.1
2011/0003557 A1* 1/2011 Morita et al. ............... 455/67.11

FOREIGN PATENT DOCUMENTS

| | | | |
|---|---|---|---|
| JP | 2003319445 A | 11/2003 | |
| JP | 2005328152 A | 11/2005 | |
| JP | 3866891 B | 1/2007 | |
| JP | 2007251755 A | 9/2007 | |

OTHER PUBLICATIONS

Chinese Office Action for CN Application No. 201080020688.X Issued on Oct. 23, 2013 with English Translation.

* cited by examiner

RADIO COMMUNICATION SYSTEM, RADIO BASE STATION DEVICE, AND DEVICE FOR DETERMINING PARAMETERS

TECHNICAL FIELD

The present invention relates to a radio communication system, a radio base station device, and a parameter determination device.

BACKGROUND ART

Heretofore, when establishing a radio network which uses a plurality of radio base stations, it is necessary to set parameters of the radio base stations according to the radio propagation environment of an actual environment. Examples of parameter contents of radio base stations include the antenna direction of the radio base stations and signal parameters of radio signals to be transmitted and/or received by the radio base stations (refer to Patent Document 1).

In order to determine these types of radio parameters, there have been performed operations such as data acquisition by running tests, and execution of radio propagation environment simulation processes based on acquired data.

PRIOR ART DOCUMENTS

Patent Documents

[Patent Document 1] Japanese Patent Publication No. 3866891

SUMMARY OF THE INVENTION

Problem to be Solved by the Invention

However, there is a problem in that data acquisition by running tests requires a large amount of time, and as a result, installation of radio base stations takes a large amount of time.

The present invention takes the above circumstances into consideration, with an object of providing a radio communication system, a radio base station device, and a parameter determination device capable of reducing the amount of time required for parameter determination, which is required in radio base stations.

Means for Solving the Problem

A radio communication system according to a first aspect of the present invention includes a radio base station device and a parameter determination device. The radio base station device includes: an antenna device which performs radio communication with a mobile station device; a positional information acquisition unit which acquires positional information representing a position of the antenna device; and a control unit which notifies the parameter determination device of the positional information acquired by the positional information acquisition unit, and controls the antenna device according to a parameter transmitted from the parameter determination device. The parameter determination device includes: a storage unit which stores information of a periphery where the radio base station device is installed; and a parameter determination unit which determines a parameter of the radio base station device based on the periphery information and the positional information of the radio base station device, and transmits the determined parameter to the radio base station device.

In the radio communication system according the first aspect of the present invention, when the periphery information stored in the storage unit is updated, the parameter determination unit may detect a radio base station device to be affected by the update, newly determine the parameter regarding the detected radio base station device, and transmit the determined parameter to the radio base station device.

A radio base station device according to a second aspect of the present invention includes: an antenna device which performs radio communication with a mobile station device; a positional information acquisition unit which acquires positional information representing a position of the antenna device; and a control unit which notifies a parameter determination device of the positional information acquired by the positional information acquisition unit, the parameter determination device determining and transmitting a parameter of the radio base station device based on information of a periphery where the radio base station device is installed and the positional information, the control unit controlling the antenna device according to the parameter transmitted from the parameter determination device.

A parameter determination device according to a third aspect of the present invention includes: a storage unit which stores information of the periphery where there is to be installed a radio base station device provided with an antenna device which performs radio communication with a mobile station device, a positional information acquisition unit which acquires positional information representing the position of the antenna device, and a control unit which notifies the parameter determination device of the positional information acquired by the positional information acquisition unit, and which controls the antenna device according to parameters transmitted from the parameter determination device; and a parameter determination unit which determines a parameter of the radio base station device based on the periphery information and the positional information of the radio base station device, and transmits the determined parameter to the radio base station device.

Effect of the Invention

In accordance with the present invention, it is possible to reduce the amount of time required for determining parameters required in a radio base station.

EMBODIMENTS FOR CARRYING OUT THE INVENTION

Figure 1:
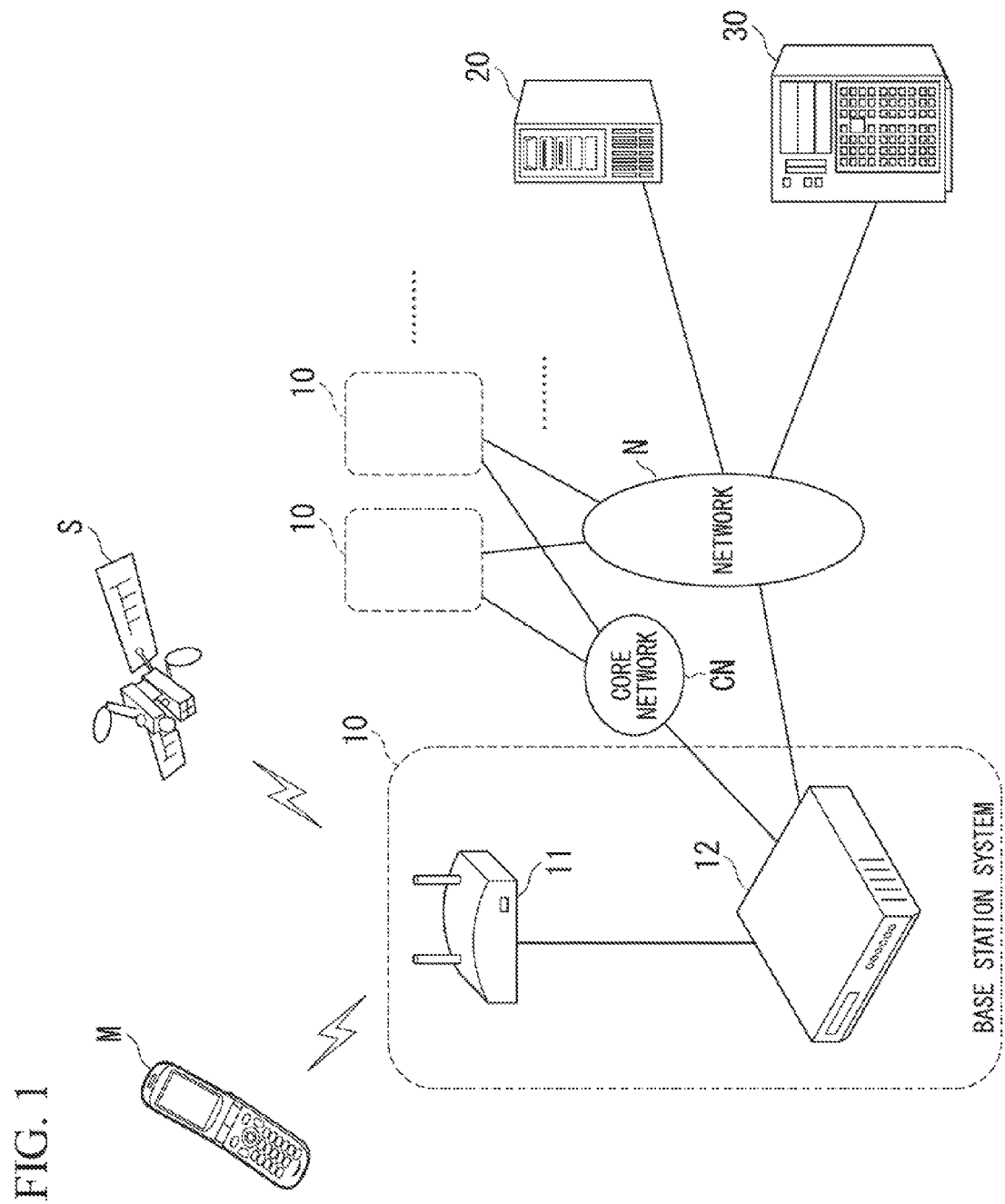
FIG. 1 is a system configuration diagram showing a system configuration of a radio communication system according to one exemplary embodiment of the present invention.

FIG. 1 is a system configuration diagram showing a system configuration of a radio communication system according to one exemplary embodiment of the present invention. First, a network configuration of the radio communication system is described. The radio communication system includes a plurality of base station systems 10, an area optimization server 20, and a base station monitoring system 30. The respective base station systems 10, the area optimization server 20, and the base station monitoring system 30 are communicably connected respectively via a network N. The respective base station systems 10 perform radio communication with a mobile station device M. The respective base station systems 10 are communicably connected to a core network CN of a radio network, to which the mobile station device M is connected. The respective base station systems 10 receive GPS signals transmitted from an artificial satellite S.

Figure 2:
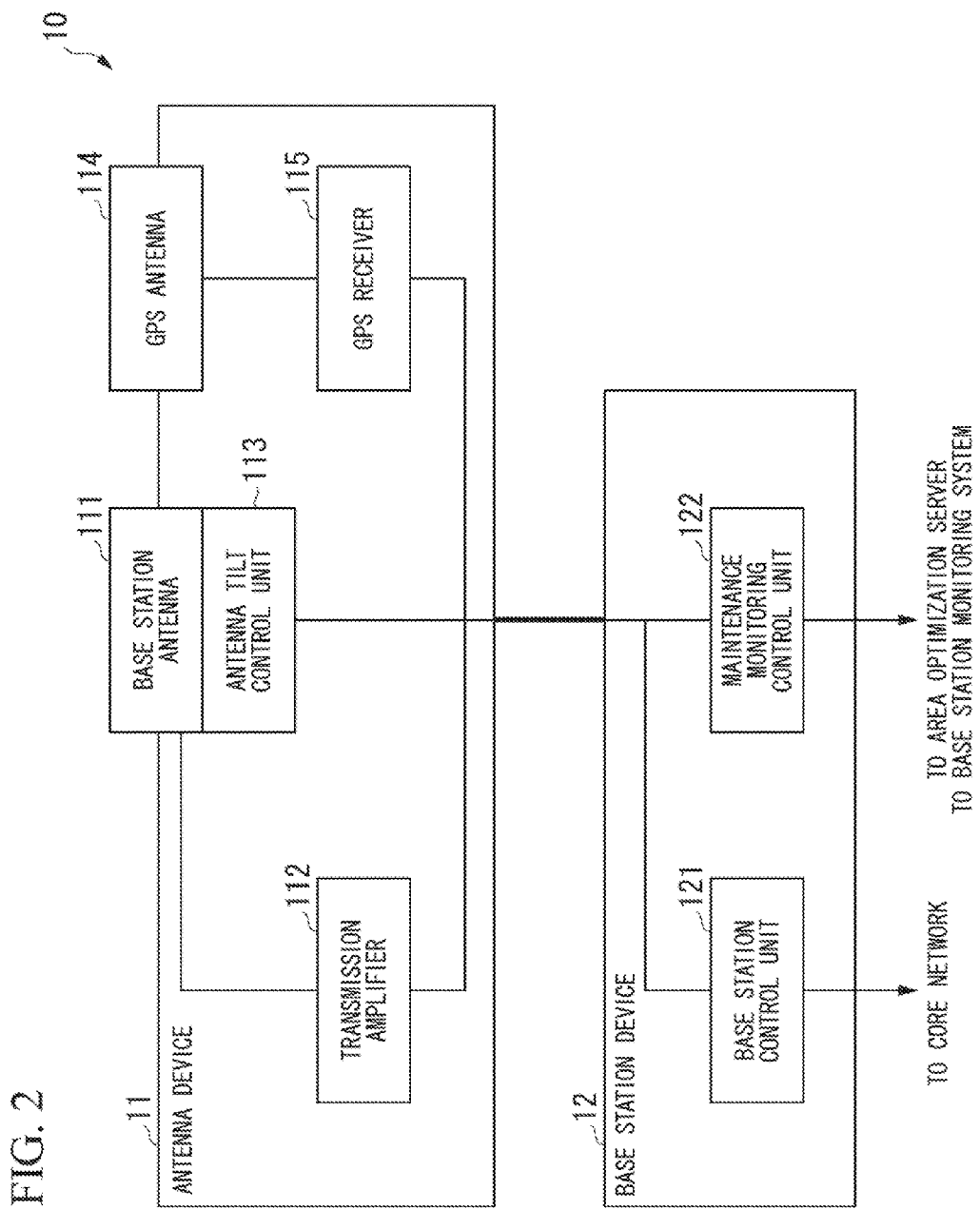
FIG. 2 is a schematic block diagram showing a function configuration of a base station system shown in FIG. 1.

FIG. 2 is a schematic block diagram showing a function configuration of the base station system 10. The base station system 10 includes an antenna device 11 and a base station device 12. The antenna device 11 and the base station device 12 may respectively be configured as being in a separate casing and may be installed at separate positions. Alternatively, the antenna device 11 and the base station device 12 may be configured as being in a single casing. FIG. 2 shows a configuration example in a case where the antenna device 11 and the base station device 12 are respectively configured as being in a separate casing.

The antenna device 11 includes a base station antenna 111, a transmission amplifier 112, an antenna tilt control unit 113, a GPS antenna 114, and a GPS receiver 115.

The base station antenna 111 performs radio communication with the mobile station device M via a radio transmission path, to thereby receive signals transmitted from the mobile station device M and transmit signals to be transmitted from the core network CN to the mobile station device M, to the mobile station device M.

The transmission amplifier 112 digital/analog-converts and amplifies signals received from a base station control unit 121, and transmits them from the base station antenna 111. Moreover, the transmission amplifier 112 analog/digital-converts the signals received from the base station antenna 111, and transmits them to the base station control unit 121.

The antenna tilt control unit 113 follows instructions from a maintenance monitoring control unit 122, and controls the physical antenna direction (elevation angle (up/down), and direction angle (left-right)) of the base station antenna 111.

The GPS antenna 114 receives GPS signals from the artificial satellite S, and transmits the received GPS signals to the GPS receiver 115.

The GPS receiver 115 calculates positional information (latitude, longitude, and altitude) of the antenna device 111 based on the GPS signals, and notifies the maintenance monitoring control unit 122 of the calculated positional information.

The base station device 12 includes a CPU (central processing unit), a memory, an auxiliary memory device, and so fourth, connected via a bus. The base station device 12 executes a base station control program and a maintenance monitoring control program to thereby function as a device including the base station control unit 121 and the maintenance monitoring control unit 122. All or some of the respective functions of the base station device 12 may be realized with use of hardware such as an ASIC (application specific integrated circuit) or a PLD (programmable logic device).

The base station control unit 121 performs operations as a base station in a mobile communication system. Specifically, the base station control unit 121 receives from the transmission amplifier 112, radio signals which have been transmitted from the mobile station device M and received by the base station antenna 111, and transmits these signals to the core network CN. Moreover, the base station control unit 121 receives, from the core network CN, signals to be transmitted to the mobile station device M, and transmits these signals to the mobile station device M via the transmission amplifier 112 and the base station antenna 111.

The maintenance monitoring control unit 122 collects information required for the base station monitoring system 30 to monitor the base station system 10 (hereunder, referred to as "monitoring information"). The maintenance monitoring control unit 122 transmits the collected monitoring information to the base station monitoring system 30. The monitoring information includes the number of hand-over failures in the base station system 10, time statistical information of the number of mobile station devices M connected to the base station system 10, and time statistical information of traffic. The maintenance monitoring control unit 122 receives radio parameters from the base station monitoring system 30, and controls the transmission amplifier 112 and the antenna tilt control unit 113 according to the received radio parameters. The maintenance monitoring control unit 122 transmits the positional information received from the GPS receiver 115 to the area optimization server 20.

Figure 3:
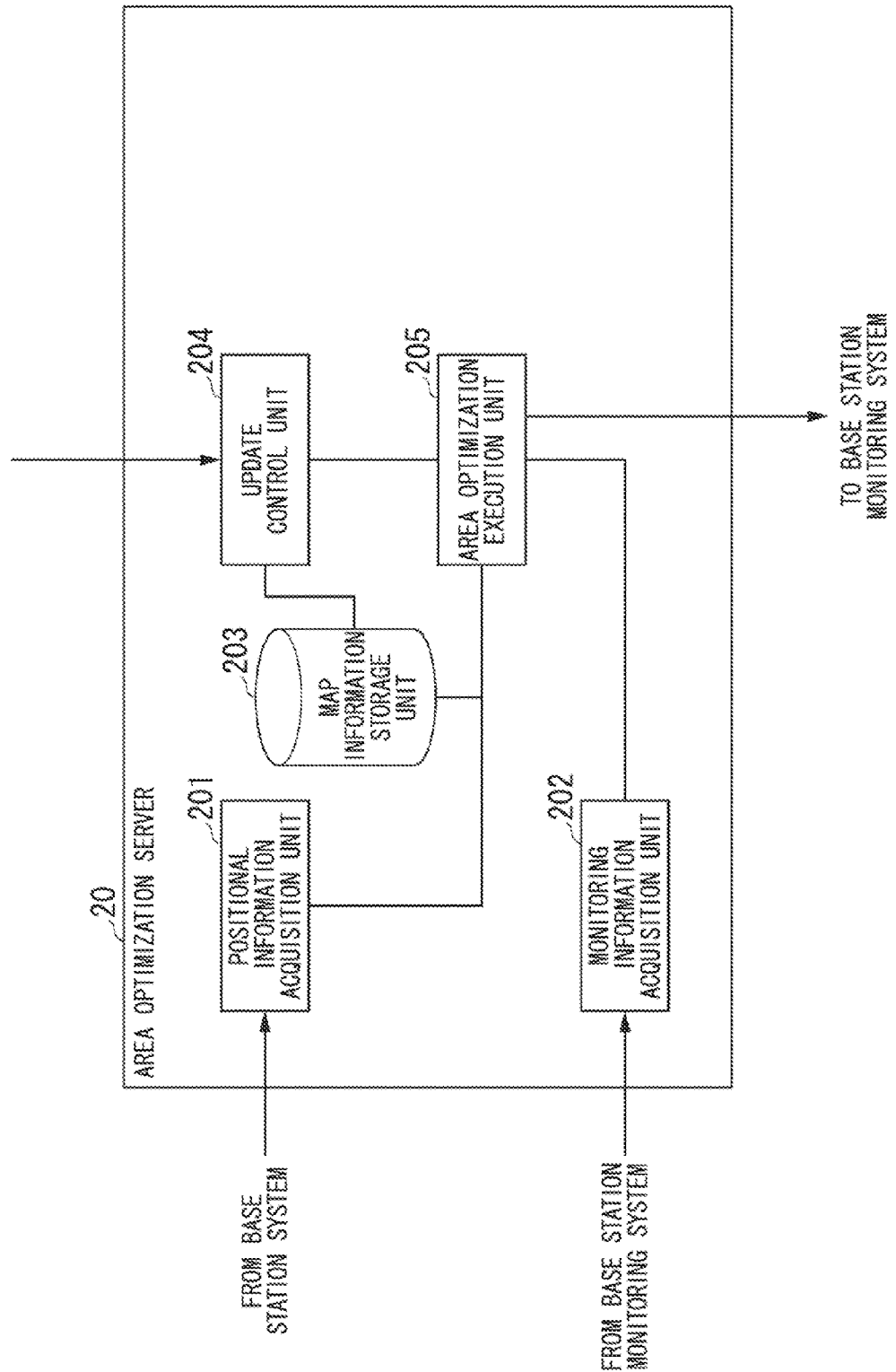
FIG. 3 is a schematic block diagram showing a function configuration of an area optimization server shown in FIG. 1.

FIG. 3 is a schematic block diagram showing a function configuration of the area optimization server 20. The area optimization server 20 includes a CPU, a memory, an auxiliary memory device, and so forth connected via a bus. The area optimization server 20 executes an area optimization program to thereby function as a device including a positional information acquisition unit 201, a monitoring information acquisition unit 202, a map information storage unit 203, an update control unit 204, and an area optimization execution unit 205. All or some of the respective functions of the area optimization server 20 may be realized with use of hardware such as an ASIC or a PLD.

The positional information acquisition unit 201 receives positional information from the base station system 10. The positional information acquisition unit 201 transmits the received positional information to the area optimization execution unit 205, and writes it into the map information storage unit 203.

The monitoring information acquisition unit 202 demands monitoring information to the base station monitoring system 30, according to instructions from the area optimization execution unit 205. Upon receiving the monitoring information, the monitoring information acquisition unit 202 transmits the received monitoring information to the area optimization execution unit 205.

The map information storage unit 203 is configured using a memory device such as a semiconductor memory device or a magnetic hard disk device, and it stores map information. Map information includes information of latitude, longitude, altitude, and shape of each structure in an area where the base station system 10 is to be installed (hereunder, referred to as "periphery area information"), and positional information of each base station system 10 already installed.

When an input of new periphery area information is made to the area optimization server 20, the update control unit 204 writes the inputted new periphery area information into the map information storage unit 203, and it notifies the area optimization server 20 that the periphery area information has been updated.

The area optimization execution unit 205 executes a simulation using an existing optimization algorithm, based on the map information stored in the map information storage unit 203, the positional information of the base station system 10 transmitted from the positional information acquisition unit 201, and the monitoring information. Based on this simulation, the area optimization execution unit 205 determines optimum values of radio parameters (hereunder, referred to as "optimum parameters") in the base station system 10 of the processing target (the base station system 10 which has transmitted positional information to the positional information acquisition unit 201). Radio parameters refer to various types of parameters at the time of operating the base station system 10. Examples of the radio parameters include; the direction of the base station antenna 111, the amplification factor when the transmission amplifier 112 amplifies signals, the subcarrier used when the base station system 10 communicates with each mobile station device M, the modulation method, and the encoding factor.

Figure 4:
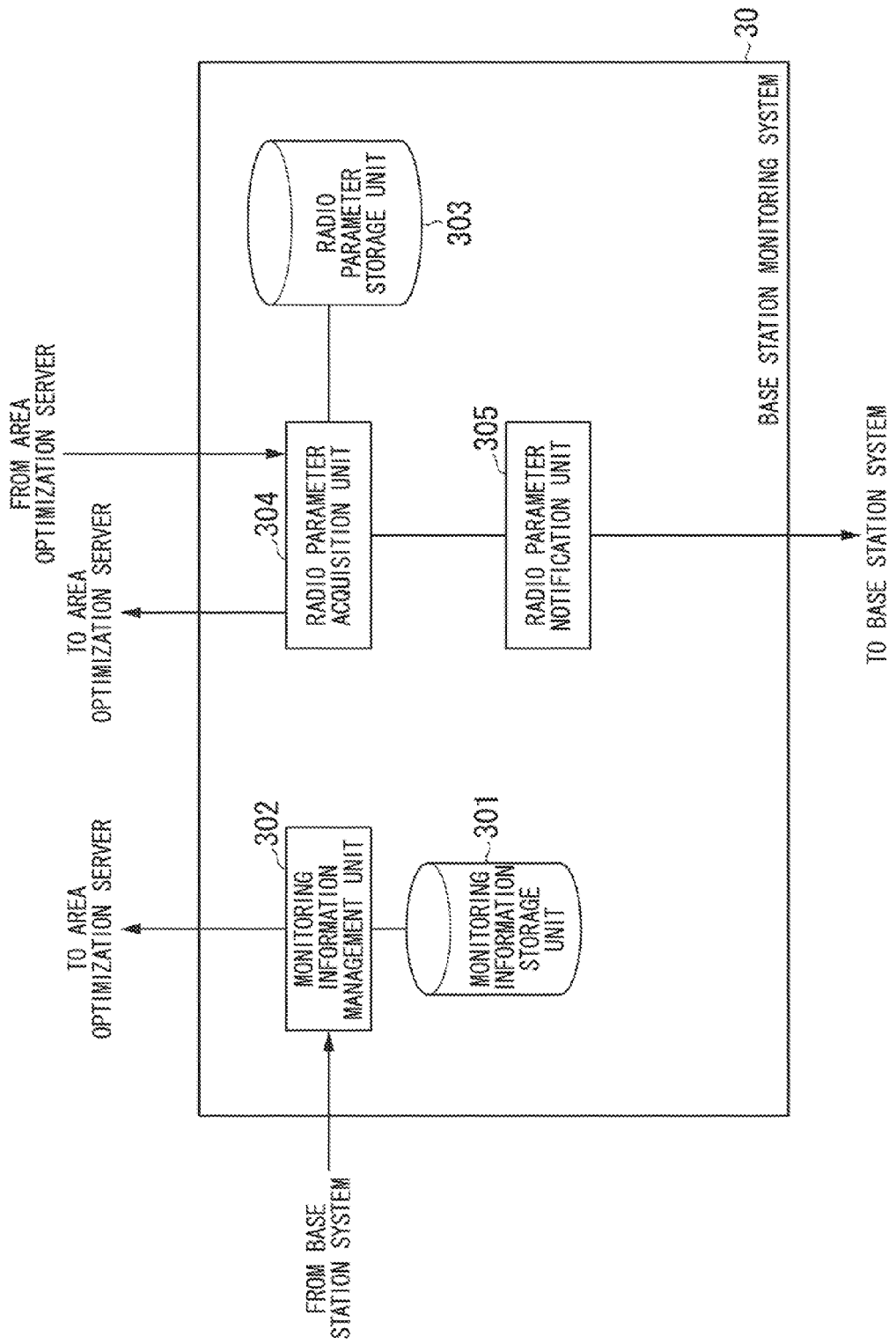
FIG. 4 is a schematic block diagram showing a function configuration of a base station monitoring system shown in FIG. 1.

FIG. 4 is a schematic block diagram showing a function configuration of the base station monitoring system 30. The base station monitoring system 30 includes a CPU, a memory, an auxiliary memory device, and so forth connected via a bus. The base station monitoring system 30 executes a base station monitoring program to thereby function as a device including a monitoring information storage unit 301, a monitoring information management unit 302, a radio parameter storage unit 303, a radio parameter acquisition unit 304, and a radio parameter notification unit 305. All or some of the respective functions of the base station monitoring system 30 may be realized with use of hardware such as an ASIC or a PLD.

The monitoring information storage unit 301 is configured using a memory storage device such as a semiconductor memory device or a magnetic hard disk device, and it stores monitoring information.

The monitoring information management unit 302 regularly receives monitoring information from the base station system 10, and writes the received monitoring information into the monitoring information storage unit 301. Upon receiving monitoring information request from the optimization server 20, the monitoring information management unit 302 reads monitoring information from the monitoring information storage unit 301 and transmits it to the area optimization server 20.

The radio parameter storage unit 303 is configured using a memory storage device such as a semiconductor memory storage device or a magnetic hard disk device. The radio parameter storage unit 303 stores radio parameters determined by the area optimization server 20, while associating them with the identifier of each base station system 10.

The radio parameter acquisition unit 304 receives the radio parameters determined for each base station system 10 from the area optimization server 20, and writes the radio parameters into the radio parameter storage unit 30, while associating them with the identifier given to the base station system 10. Upon a request from the area optimization server 20, the radio parameter acquisition unit 304 reads the stored radio parameters associated with the requested base station system 10 from the radio parameter storage unit 303, and transmits them to the area optimization server 20.

The radio parameter notification unit 305 transmits the radio parameters, which have been received from the area optimization server 20 by the radio parameter acquisition unit 304, to the base station system 10 of the processing target.

Figure 5:
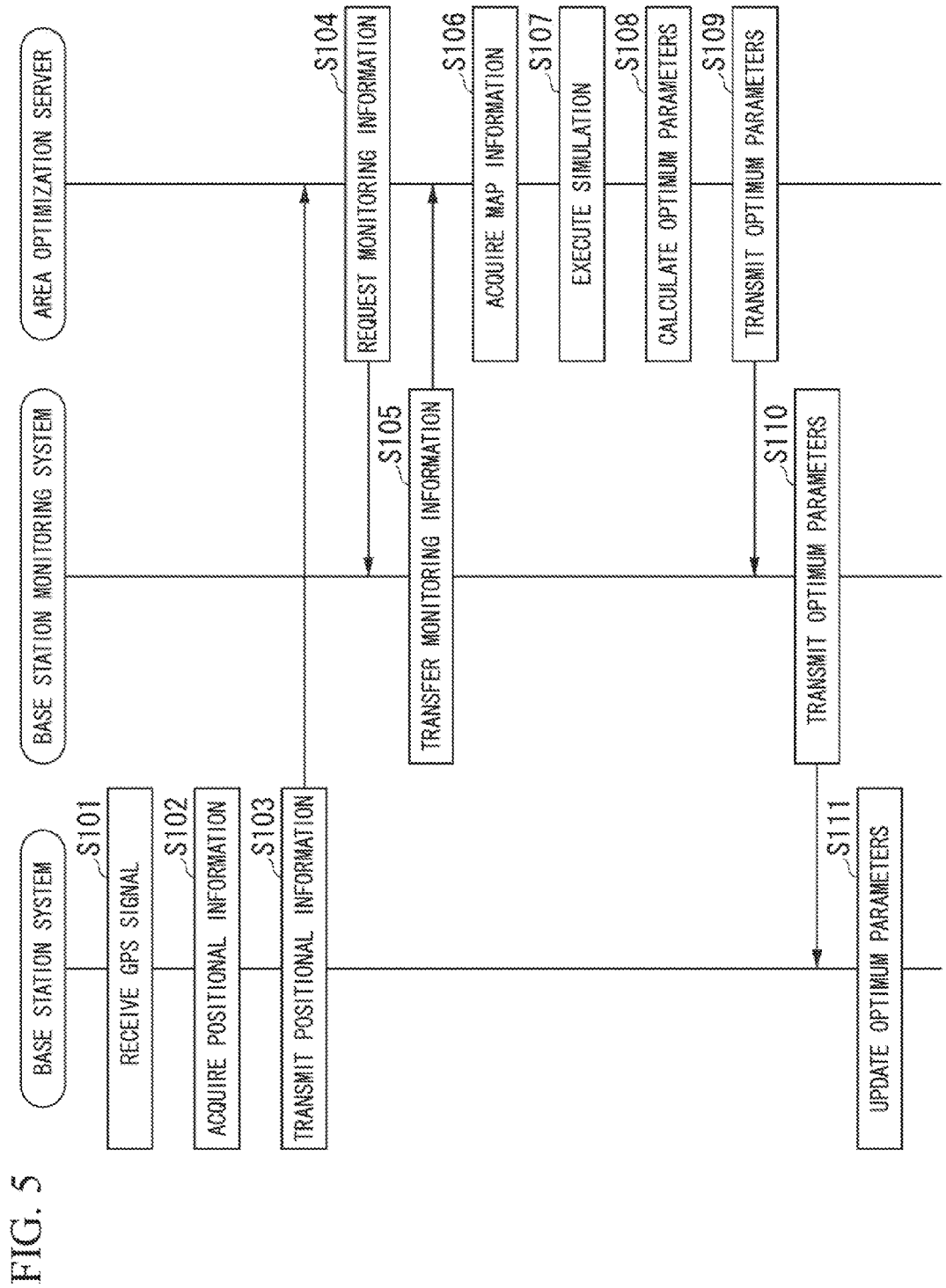
FIG. 5 is a flow chart showing an operation example of the communication system in a case where a base station system is newly installed, according to the one exemplary embodiment of the present invention.

FIG. 5 is a flow chart showing an operation example of the communication system in a case where a base station system 10 is newly installed. Hereunder, there is described communication system operations performed after the base station system 10 has been newly installed and powered on. When the base station system 10 is powered on, the GPS antenna 114 receives GPS signals (step S101). The GPS receiver 115 calculates positional information of the antenna device 11 based on the GPS signals (step S102). The GPS receiver 115 transmits the calculated positional information to the maintenance monitoring control unit 122, and the maintenance monitoring control unit 122 transmits the positional information to the area optimization server 20 (step S103).

Upon receiving the positional information from the base station system 10, the positional information acquisition unit 201 of the area optimization server 20 transmits the received positional information to the area optimization execution unit 205. Upon receiving the positional information, the area optimization execution unit 205 requests the base station monitoring system 30 for monitoring information via the monitoring information acquisition unit 202 (step S104). Upon receiving request for the monitoring information from the area optimization server 20, the monitoring information management unit 302 of the base station monitoring system 30 reads monitoring information from the monitoring information storage unit 301, and transmits it to the area optimization server 20 (step S105).

The area optimization execution unit 205 of the area optimization server 20 reads map information from the map information storage unit 203 (step S106), executes a simulation based on an optimization algorithm (step S107), and determines optimum values of radio parameters (optimum parameters) of the base station system 10 of the processing target (step S108). The area optimization execution unit 205 transmits the determined optimum parameters to the base station monitoring system 30 (step S109).

Upon receiving the optimum parameters, the radio parameter acquisition unit 304 of the base station monitoring system 30 writes the received optimum parameters into the radio parameter storage unit 303, and transmits them to the radio parameter notification unit 305. Then, the radio parameter notification unit 305 transmits the received optimum parameters to the base station system 10 of the processing target (step S110).

Upon receiving the optimum parameters from the base station monitoring system 30, the maintenance monitoring control unit 122 of the base system 10 controls the transmission amplifier 112 and the antenna tilt control unit 113 based on the received optimum parameters (step S111). Specifically, the maintenance monitoring control unit 122 sets an amplification factor and so forth of the transmission amplifier 112 based on the optimum parameters, and drives the antenna tilt control unit 13 to control the direction of the base station antenna 111 based on the optimum parameters. Then, the transmission amplifier 112 operates according to the set amplification factor and so forth.

Figure 6:
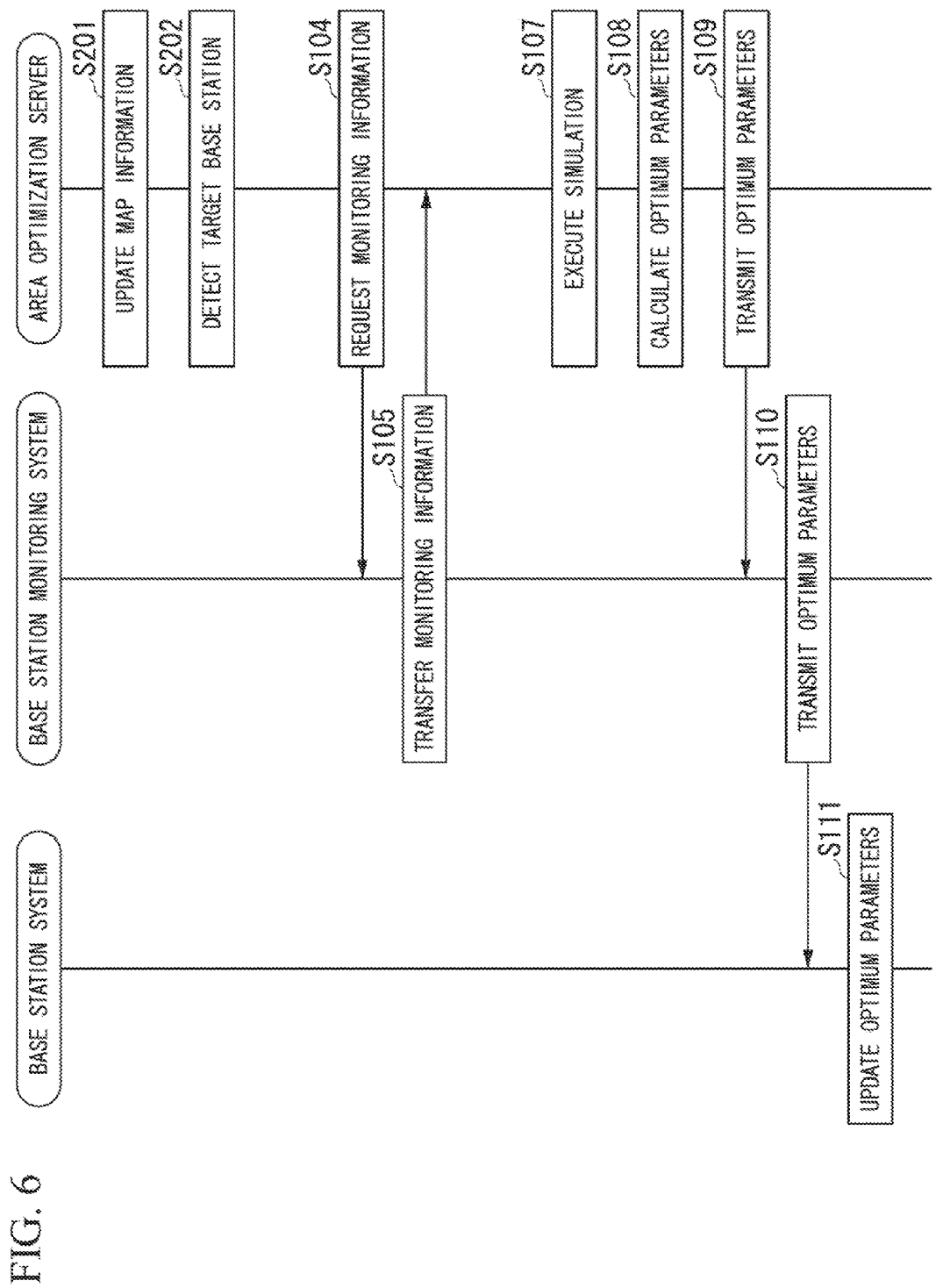
FIG. 6 is a flow chart showing an operation example of the communication system in a case where map information in the area optimization server is updated, according to the one exemplary embodiment of the present invention.

FIG. 6 is a flow chart showing an operation example of the communication system in a case where map information in the area optimization server 20 is updated. Hereunder, there is described communication system operations performed after a base station system 10 has been newly installed and powered on. Processes the same as those in FIG. 5 are denoted by the same reference symbols in FIG. 6, and descriptions thereof are omitted.

When the update control unit 204 writes new map information into the map information storage unit 203 (step S201), it notifies the area optimization execution unit 205 of the updating of the map information and of information about the area for which the information has been updated. Upon receiving the update notification, the area optimization execution unit 205 reads the updated map information from the map information storage unit 203, and detects a base station system 10 related to the area for which the information has been updated. A base station system 10 related to the area for which information has been updated is a base station system 10 with a possibility that the information having been updated may affect the contents of the radio parameter optimum values. The area optimization execution unit 205 calculates respectively, for example, the positional information of each base station system 10 stored in the map information storage unit 203, and the distance from the area for which the information has been updated, and it detects a base station system 10 with a calculated distance greater than a pre-set threshold value as being a "base station system 10 related to the area for which the information has been updated". Subsequently, the area optimization execution unit 205 executes the processes of steps S104, S105, and S107 through S111, for each of all detected base station systems 10.

According to the radio communication system configured in this manner, when newly installing a base station system 10, radio parameter optimum values which need to be set for this base station system 10 are determined by the area optimization server 20. Therefore, there is no need for carrying out data acquisition by running tests and the like. Accordingly, it is possible to reduce the amount of time required for determining parameters required in a radio base station (radio parameter optimum values).

Moreover, each base station system 10 acquires positional information of the position where this base station system 10 is installed by means of GPS, and transmits it to the area optimization server 20. Therefore, there is no need for an administrator of the area optimization server 20 to manually input positional information of each base station system 10 to the area optimization server 20, and it becomes possible to reduce the amount of time required for determining parameters required in a radio base station.

Furthermore, when the map information is updated, the update control unit 204 of the area optimization server 20 notifies the area optimization server 20 of this update. Upon receiving this notification, the area optimization server 20 executes a simulation based on an optimization algorithm according to this notification, and performs a notification of the determined radio parameter optimum values. As a result, optimum radio parameters are always set in each base station system 10 according to the environment related to surrounding structures.

Moreover, when the area optimization execution unit 205 performs processing after the map information has been updated, the area optimization execution unit 205 detects only the base station system 10 which is affected by the information update, and performs the process of determining radio parameter optimum values for only the detected base station system 10. Therefore, unnecessary processing can be omitted, and processing time and cost can be reduced.

Modified Example

The area optimization server 20 and the base station monitoring system 30 may be configured as being an integrated device.

The antenna device 11 may be configured as being provided with no GPS antenna 114 and no GPS receiver 115, and provided with a positional information input unit. In this case, the positional information input unit is configured as buttons, a communication interface, a recording media interface (such as a USB interface or CD-ROM read-out device), or a communication interface with another information processing device, and it receives inputs of positional information of the installation position of the antenna device 11 by an installer who installed the antenna device 11.

The exemplary embodiments of the present invention have been described with reference to the drawings. However, specific configurations are not limited to these exemplary embodiments, and may include designs that do not depart from the scope of the invention.

This application is based upon and claims the benefit of priority from Japanese patent application No. 2009-117952, filed May 14, 2009, the disclosure of which is incorporated herein in its entirety by reference.

INDUSTRIAL APPLICABILITY

The present invention may be applied to a radio communication system, a radio base station device, and a parameter determination device. According to these radio communication system, radio base station device, and parameter determination device, it is possible to reduce the amount of time required for determining parameters required in a radio base station.

REFERENCE SYMBOLS

10 Base station system (radio base station device)
11 Antenna device
12 Base station
20 Area optimization server (parameter determination device)
30 Base station monitoring system
111 Base station antenna
112 Transmission amplifier
113 Antenna tilt control unit
114 GPS antenna
115 GPS receiver (positional information acquisition unit)
121 Base station control unit
122 Maintenance monitoring control unit (control unit)
201 Positional information acquisition unit
202 Monitoring information acquisition unit
203 Map information storage unit
204 Update control unit
205 Area optimization execution unit
301 Monitoring information storage unit
302 Monitoring information management unit
303 Radio parameter storage unit
304 Radio parameter acquisition unit
305 Radio parameter notification unit

The invention claimed is:

1. A radio communication system comprising a radio base station device and a parameter determination device,
the radio base station device comprising:
an antenna device which performs radio communication with a mobile station device;
a positional information acquisition unit which acquires positional information representing a position of the antenna device; and
a control unit which notifies the parameter determination device of the positional information acquired by the positional information acquisition unit, and controls the antenna device according to a parameter transmitted from the parameter determination device, and
the parameter determination device comprising:
a storage unit which stores periphery area information including information of position, altitude, and shape of each structure in an area a-periphery where the radio base station device is installed; and a parameter determination unit which determines a parameter of the radio base station device based on the periphery area information and the positional information of the radio base station device, and transmits the determined parameter to the radio base station device.

2. The radio communication system according to claim 1, wherein when the periphery area information stored in the storage unit is updated, the parameter determination unit detects a radio base station device to be affected by the update, newly determines the parameter regarding the detected radio base station device, and transmits the determined parameter to the radio base station device.

3. The radio communication system according to claim 1, wherein the position of each structure is latitude and longitude of each structure.

4. A radio base station device comprising:
an antenna device which performs radio communication with a mobile station device;
a positional information acquisition unit which acquires positional information representing a position of the antenna device; and
a control unit which notifies a parameter determination device of the positional information acquired by the positional information acquisition unit, the parameter determination device determining and transmitting a parameter of the radio base station device based on periphery area information including information of position, altitude, and shape of each structure in an area where the radio base station device is installed and the positional information, the control unit controlling the antenna device according to the parameter transmitted from the parameter determination device.

5. The radio base station device according to claim 4, wherein the position of each structure is latitude and longitude of each structure.

6. A parameter determination device comprising:
a storage unit which stores periphery area information including information of position, altitude, and shape of each structure in an area where a radio base station device is installed, the radio base station device including an antenna device which performs radio communication with a mobile station device, a positional information acquisition unit which acquires positional information representing the position of the antenna device, and a control unit which notifies the parameter determination device of the positional information acquired by the positional information acquisition unit, and which controls the antenna device according to parameters transmitted from the parameter determination device; and
a parameter determination unit which determines a parameter of the radio base station device based on the periphery area information and the positional information of the radio base station device, and transmits the determined parameter to the radio base station device.

7. The parameter determination device according to claim 6, wherein the position of each structure is latitude and longitude of each structure.

* * * * *